United States Patent [19]

Süling et al.

[11] Patent Number: 4,997,873
[45] Date of Patent: Mar. 5, 1991

[54] COPOLYMERS CONTAINING PERFLUOROALKYL GROUPS

[75] Inventors: Carlhans Süling, Odenthal; Jutta Röttger; Henning Bachem, both of Cologne; Joachim Probst, Leverkusen; Wilfried Kortmann, Nachrodt-Wiblingwerde, all of Fed. Rep. of Germany

[73] Assignee: Bayer Aktiengesellschaft, Leverkusen, Fed. Rep. of Germany

[21] Appl. No.: 355,727

[22] Filed: May 22, 1989

[30] Foreign Application Priority Data

Jun. 8, 1988 [DE] Fed. Rep. of Germany ....... 3819476
Dec. 17, 1988 [DE] Fed. Rep. of Germany ....... 3842539

[51] Int. Cl.$^5$ ............................................. C08F 2/16
[52] U.S. Cl. ................................... 524/458; 524/460
[58] Field of Search ............................... 524/458, 460

[56] References Cited

U.S. PATENT DOCUMENTS 4,504,605  3/1985  Duke ................................... 524/458

Primary Examiner—Joseph L. Schofer
Assistant Examiner—Peter Mulcahy
Attorney, Agent, or Firm—Sprung, Horn Kramer & Woods

[57] ABSTRACT

Aqueous dispersions of copolymers and graft copolymers which are formed from ethylenically unsaturated perfluoroalkyl monomers and ethylenically unsaturated monomers from from perfluoroalkyl groups and which are prepared in the presence of emulsifiers containing cationic groups are used for imparting a water-repellent and oleo-repellent finish to textiles, leather and paper.

7 Claims, No Drawings

COPOLYMERS CONTAINING PERFLUOROALKYL GROUPS

The invention relates to aqueous dispersions of copolymers and graft copolymers which are formed from ethylenically unsaturated perfluoroalkyl monomers and ethylenically unsaturated monomers free from perfluoroalkyl groups and which are prepared in the presence of emulsifiers containing cationic groups, to a process for their preparation and to their use for imparting a water-repellent and oleo-repellent finish to textiles, leather and paper.

Copolymer dispersions based on monomers containing perfluoroalkyl groups in water are known. They provide a good oleo-repellent finish on many substrates, if the perfluoroalkyl radicals are linear and contain more than 6 C atoms in the perfluoroalkyl radical.

Emulsifiers or emulsifier systems are used in the preparation of these copolymer dispersions by emulsion polymerization. Depending on the emulsifier system, anionically or cationically stabilized dispersions whose stability on storage can be improved by the addition of nonionic emulsifiers are obtained. Cationic polyperfluoroalkyl (meth)acrylate copolymer dispersions are particularly suitable, also in conjunction with further finishing agents or textile auxiliaries, for imparting an oleo-repellent finish to textiles and carpets.

The effectiveness of oleo-repelling agents based on polyperfluoroalkyl (meth)acrylate dispersions depends essentially on the concentration of perfluoroalkyl groups in the copolymer, on the composition of the copolymer and on its particle size. The nature of the emulsifiers used also affects the technical properties in use. From the point of view of technical performance in use it is frequently necessary that a water-repellent finish should also be produced additionally in the course of imparting an oleo-repellent finish.

The emulsifiers required for the preparation of the dispersions have a disadvantageous effect on the water-repellency desired, particularly if they are used in high concentrations. In addition, the emulsifiers are often an additional reason why the finished goods have a high soil retention capacity. In general, emulsifiers have to be used in disadvantageously high concentrations for the preparation of very finely disperse dispersions which are particularly effective precisely because of this finely disperse nature. The object is therefore presented of working out emulsifier systems which allow very finely disperse perfluoroalkyl polymer dispersions to be prepared and do not have a disadvantageous effect on their effectiveness as water-repelling agents and on their soiling behaviour. Finely disperse dispersions are to be understood as meaning dispersions having average particle sizes below 600 nm. Particularly good results are obtained if dispersions having average particle sizes of 200 to 500 nm are used.

It has now been found that aqueous dispersions of copolymers and graft copolymers which are formed from ethylenically unsaturated perfluoroalkyl monomers and other known ethylenically unsaturated monomers and which have the desired properties are obtained if the copolymerization is carried out in the presence of polymeric emulsifiers of the general formula (I)

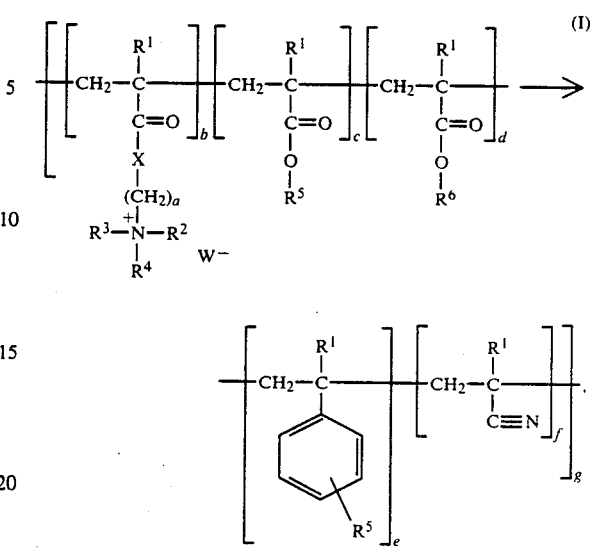

wherein
X denotes oxygen or NH,
$R^1$ denotes hydrogen or methyl,
$R^2$ denotes $C_1$–$C_4$-alkyl,
$R^3$ denotes $C_1$–$C_4$-alkyl,
$R^4$ denotes H, $C_1$–$C_{18}$-alkyl, aralkyl or cycloalkyl or a radical of the formula

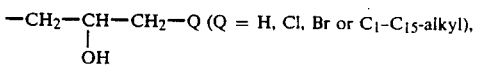

$R^5$ denotes hydrogen or $C_1$–$C_8$-alkyl,
$R^6$ denotes $C_{12}$–$C_{24}$-alkyl,
$W^-$ denotes an anion,
a denotes 1–3 and the weight fractions b, c, d, e and f denote 0.1–0.8, 0–0.5, 0–0.5, 0–0.7 and 0–0.6, respectively, b+c+d+e+f being 1, and
g should be so chosen that molecular weights $M_w$ of 5,000 to 1,000,000 result.

In formula (I),
$R^2$ and $R^3$ independently of one another preferably represent methyl or ethyl,
$R^4$ preferably represents $C_1$–$C_6$-alkyl, benzyl, phenylethyl or cyclohexyl or a radical of the formula

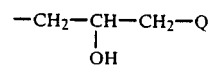

$R^5$ preferably represents hydrogen or $C_1$–$C_6$-alkyl,
$R^6$ preferably represents $C_{15}$–$C_{22}$-alkyl and
$W^-$ preferably represents $Cl^-$, $Br^-$, $\frac{1}{2} SO_4^{2-}$, $\frac{1}{3} PO_4^{3-}$, $CH_3$—O—$SO_3^-$ or $CH_3$—$COO^-$.

The remaining symbols have the meaning mentioned above.

The cationic emulsifiers of the general formula (I) are water-soluble compounds. They are obtained by the free-radical initiated copolymerization of styrene and its derivatives, (meth)acrylonitrile, (meth)acrylic acid and its esters with dialkylaminoalkyl (meth)acrylates or dialkylaminoalkyl (meth)acrylamides in solution, dispersion or bulk, and by subsequent quaternization, the degree of quaternization being at least 10%.

A preferred embodiment is the polymerization of the mixtures of monomers in solution, with subsequent quaternization. Customary peroxide initiators or aliphatic azo compounds can be used as initiators. It is advantageous in solution polymerization to use solvents which do not have excessively high transfer constants, for example butanol, isopropanol, acetone, methyl isobutyl ketone or alkyl acetates.

Derivatives containing tertiary amino groups are preferably used as aminoalkyl (meth)acrylates. Diethylaminoethyl (meth)acrylate, dimethylaminopropyl (meth)acrylate, dimethylaminopropyl (meth)acrylamide and dimethylaminoethyl (meth)acrylate may be mentioned as examples.

Preferred polymers (I) are obtained from these basic monomers and alkyl (meth)acrylates having 1–4 C atoms in the alkyl radical and/or alkyl (meth)acrylates having 8 to 22 C atoms in the alkyl radical in approximately equimolar amounts or from these basic monomers, styrene and acrylonitrile in a ratio of 1 to 2, 2 to 10 and 1 to 1.5. The quaternization of the basic polymers can be carried out by means of known quaternizing agents, such as alkyl halides, dialkyl sulphates and monoepoxides, and is effected in a manner which is known per se (for example as specified in EP-A 0,160,872). In this reaction the quaternizing agent is employed in a molar ratio of 0.25–2.5, preferably 0.5–2.0, relative to moles of basic nitrogen in the precursor. The tertiary amino groups which may remain are protonated.

Preferred ethylenically unsaturated perfluoroalkyl monomers are those of the formulae

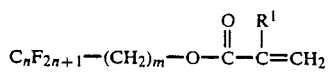

and

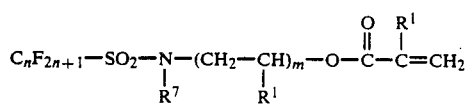

wherein
$R^1$ denotes hydrogen or methyl,
$R^7$ denotes $C_1$–$C_4$-alkyl,
m denotes 1 or 2 and
n denotes 6–12.

The choice of the ethylenically unsaturated monomers which are used in addition to the perfluoroalkyl monomers for the preparation of the polymer dispersions according to the invention depends on the particular requirements for technical performance in use. Examples of these comonomers are styrene, acrylic and methacrylic acid esters, vinyl esters, such as vinyl acetate, maleic acid derivatives and acrylamides or methacrylamides.

Good properties in regard to technical performance in use are obtained if perfluoroalkyl monomers of the formulae (II) and/or (III) are copolymerized, using the emulsifiers (I) according to the invention with mixtures of monomers containing at least one component of the formula

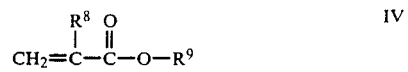

wherein
$R^8$ represents hydrogen, methyl or fluorine and
$R^9$ represents a $C_8$–$C_{22}$-alkyl radical.

Examples of comonomers of the general formula (IV) are acrylic or methacrylic acid esters of behenyl alcohol, stearyl alcohol, oleyl alcohol, nonyl alcohol or octyl alcohol or mixtures of isomers of such alcohols.

The esters (IV) can be copolymerized as a mixture with the fluorine-free monomers mentioned above, for example also with esters of acrylic and methacrylic acid and $C_1$–$C_7$-alkanols.

In general, water-insoluble comonomers are preferred, even if water-soluble comonomers can be used, for example in proportions of up to 10%, preferably 2%, in order to ensure a certain adhesion to the various substrates when imparting an oleo-repellant/water-repellant finish.

The polymer dispersions according to the invention are prepared by processing in water in accordance with the emulsion polymerization procedure. The perfluoroalkyl monomers are dissolved to form a homogeneous solution together with the other comonomers, if necessary by using auxiliary solvents. Suitable auxiliary solvents are solvents which do not have much effect on the course of the emulsion polymerization, for example alcohols, such as methanol, ethanol, n-propanol, isopropanol and tert.-butanol, ketones, such as acetone and methyl ethyl ketone, ethers, such as tetrahydrofuran, and amides, such as dimethylacetamide. It is often advantageous to use, as the auxiliary solvent, solvents immiscible, or of only limited miscibility, with water, such as esters of lower alcohols with lower carboxylic acids, provided that ester saponification cannot take place under the conditions of emulsion polymerization. The use of ethyl acetate, methyl acetate, methyl propionate or methyl ethyl ketone is particularly advantageous. The auxiliary solvent is removed when the polymerization is complete.

The emulsions are prepared in stirrer units, ultrasonic equipment or homogenizers.

The polymerization is initiated by free-radical formers. Examples of suitable free-radical formers are aliphatic azo compounds, such as azodiisobutyronitrile and organic or inorganic peroxides. Organic peroxides which may be mentioned are diacyl peroxides, such as dibenzoyl peroxide, hydroperoxides, such as tert.-butyl hydroperoxide, tert.-butyl perpivalate and percarbonates, such as dicyclohexyl percarbonate. The alkali metal salts of peroxodisulphuric acid are particularly suitable as inorganic peroxides.

In general, the polymerization temperatures are up to 100° C., preferably 50°–100° C. and particularly 60°–90° C.

It is also possible to carry out the copolymerization at temperatures of 40° C. or below by using Redox systems. Examples of suitable initiator systems are mixtures of peroxodisulphates and reducing sulphur compounds, such as bisulphites or thiosulphates, or combinations of diacyl peroxides with tertiary amines. The known chain transfer agents based on mercapto compounds or aliphatic aldehydes can be used to control the molecular weights or the molecular weight distributions.

A graft polymerization in which portions of the copolymer are grafted onto the cationic emulsifier (I) can take place at the same time as the polymerization.

The stability of the copolymer dispersions according to the invention is increased further by this means. Grafting reactions of this type are described, for example, by H. Gerrens in "Fortschritte der Hoch-polymer-Forschung" ("Advances in Reseach on High Polymers"), Volume I (1959), page 300.

Particular embodiments of the copolymer dispersions according to the invention are graft copolymer dispersions prepared by using known grafting bases. Graft copolymerization using perfluoroalkyl (meth)acrylates in an aqueous emulsion is known. It is described, for example, in German Offenlegungsschriften 3,407,361 and 3,407,362. Suitable grafting bases are, in particular, hydrophobic polymers in the form of aqueous dispersions. Particularly good application results are obtained if the grafting bases themselves have the properties of water-repelling agents.

In order to achieve a desired particle size distribution and to improve the technical performance properties in use, it can be advantageous to use, in the preparation, further cationic and/or nonionic emulsifiers in addition to the cationic emulsifiers (I). Examples of cationic emulsifiers of this type are quaternary ammonium or pyridinium salts, for example stearyldimethylbenzylammonium chloride or N,N,N-trimethyl-N-perfluorooctanesulphonamidopropylammonium chloride.

In particular the stability of the copolymer dispersions is increased by nonionic emulsifiers.

Examples of nonionic emulsifiers are polyglycol ethers, for example ethylene oxide/propylene oxide block polymers or copolymers and also alkoxylation products, in particular ethoxylation products, of fatty alcohols, alkylphenols, fatty acids, fatty acid amides or sorbitol monooleate.

0.1 to 7% by weight, preferably 0.2–4% by weight, of the cationic emulsifiers according to the invention, relative to the amounts of monomer employed for the polymerization, are used in the preparation of the polymer dispersions. 1–5% by weight, preferably 1.2–3% by weight, of the customary cationic emulsifiers can be used. The known nonionic emulsifiers are advantageously employed in amounts of 1–5% by weight, preferably 1.5–4.5% by weight. In preparing copolymer dispersions which have particularly advantageous technical performance properties in use it is necessary to use emulsifier systems containing the various types of emulsifier described in approximately equal amounts. The total amount of all the emulsifiers should not exceed 10% by weight.

Surprisingly, it has been found that the dispersions according to the invention enable an oleo-repellent and water-repellent finish to be imparted successfully to natural and synthetic materials, such as fibres, filaments, yarns, nonwovens, woven fabrics, warp-knitted fabrics and weft-knitted fabrics, in particular carpets, composed especially of cellulose and derivatives thereof, but also composed of polyester, polyamide and polyacrylonitrile materials, wool or silk.

Finishing is carried out by known processes, preferably by the exhaustion or padding process, for example between room temperature and 40° C., but also by nip-padding or spraying followed by a heat treatment at 80°–180° C., prefereably 120° to 150° C.

PREPARATION OF EMULSIFIERS (I)

EXAMPLE 1

100 parts by weight of dimethylaminoethyl methacrylate and 100 parts by weight of stearyl methacrylate are dissolved in 800 parts by weight of tert.-butanol in a reactor. After the oxygen of the air has been expelled, 4 parts by weight of azodiisobutyronitrile (AIBN) are added. The reactor is heated to 70° C. and is kept at this temperature with stirring for 7 hours. After cooling, the monomer conversion is found to be >96% by determining the solids content.

EXAMPLE 2a 9.9 g of propylene oxide are added at 40° C. in the course of 30 minutes to a solution of 150 g of a precursor according to Example 1 and also 4.5 g of acetic acid and 40 g of tert.-butanol. The mixture is then diluted with 30 g of tert.-butanol and stirring is continued for 3 hours at 40°–45° C. 55 g of acetic acid are then added in order to terminate the alkylation, and the finished product is degassed and its solids content is adjusted to the desired value by means of tert.-butanol.

Solids content: 15.0% by weight.
pH: 4.5.

EXAMPLE 2b

The procedure of Example 2a is followed, but only 6.6 g of propylene oxide instead of 9.9 g are employed.
Solids content: 15.0% by weight. pH: 4.8.

EXAMPLE 2c 83.3 g (0.9 mol) of epichlorohydrin are added with stirring at 25°–30° C. to a solution of 706.8 g (0.5 mol) of the basic precursor according to Example 1 in 150 g of tert.-butanol, and the mixture is warmed slowly in the course of one hour to an internal temperature of 65° C.

Stirring is continued at 65° C. until the viscosity increases, and the reaction mixture is then diluted with 200 g of tert.-butanol, in portions. As soon as the desired viscosity has been reached, the mixture is acidified with acetic acid and cooled to 50° C., and the finished product is degassed. The solids content is subsequently adjusted by dilution with tert.-butanol.

Solids content: 10.0% by weight.
Viscosity: 62 mPas/25° C.
pH: 3.6.

EXAMPLE 3

5,270 g of isopropanol are initially placed in a 40 l autoclave. The autoclave is thoroughly flushed with nitrogen and is then heated to 80° C. Mixtures I and solutions II from Table 1 are metered in at this temperature in the course of 4 hours with the exclusion of air. Stirring is then continued for 1 to 2 hours and the mixture is reactivated with solution III. After that it is stirred at 80° C. for approximatley 6 to 12 hours. After the terpolymerization, the amount of acetic acid (IV) indicated in Table 1 is metered into the polymer at the same temperature.

The monoepoxide (V) is then metered in, as quaternizing agent, in the course of approximately 15 minutes and the mixture is stirred for approximately 1 hour. After that the remaining amount of acetic acid (VI) is added. Approximately 63–65 l of demineralized water at a temperature of approximately 60° C. are initially placed in a 120 l stock vessel equipped with a stirrer, and the contents of the 40 l autoclave are combined with this.

The preparation of a homogeneous aqueous solution is effected with vigorous stirring in a short time. The aqueous solutions, which still contain organic solvent, have the properties also listed in Table 1.

TABLE 1

|  | Emulsifier | | | | |
| --- | --- | --- | --- | --- | --- |
|  | A | B | C | D | E |
| Polymerization and quaternization temperature (°C.) | 80 | 80 | 80 | 80 | 80 |
| I. N,N-Dimethylaminoethyl methacrylate (g) | 3217 | 3217 | 2257 | 3217 | 3217 |
| Styrene (g) | 10244 | 10244 | 10608 | 10244 | 10244 |
| Acrylonitrile (g) | 2644 | 2644 | 3219 | 2644 | 2644 |
| II. Azoisobutyronitrile (g) | 500 | 500 | 550 | 500 | 500 |
| Acetone (g) | 3000 | 3000 | 3000 | 3000 | 3000 |
| III. Azoisobutyronitrile (g) | 50 | 50 | 50 | 50 | 50 |
| Acetone (g) | 300 | 300 | 300 | 300 | 300 |
| IV. Acetic acid (g) | 1229 | 984 | 690 | 984 | 984 |
| V. 1,2-Epoxydodecane (g) | 1131 | — | — | — | — |
| 1,2-Epoxyhexane (g) | — | 1025 | 719 | — | — |
| 1,2-Epoxybutane (g) | — | — | — | 885 | — |
| Propylene oxide (g) | — | — | — | — | 891 |
| VI. Acetic acid (g) | 1230 | 1475 | 1035 | 1475 | 1475 |
| Concentration (%) | 20.3 | 20.1 | 20.2 | 20.0 | 19.9 |
| Viscosity (at 20° C.) (mPa.s)* | 50–100 | 30–70 | 300–500 | 20–50 | 20–50 |
| pH: | 4.2 | 4.2 | 4.1 | 4.2 | 4.2 |
| Appearance of the emulsifier solution: | slightly cloudy | clear | clear | clear | clear |

*Viscosity not constant, since samples have non-Newtonian viscosity

PREPARATION OF A POLYCONDENSATE WHICH CAN BE USED AS A GRAFTING BASE

EXAMPLE 4

1.5 mol of behenic acid are melted, and 1 mol of hexamethylolmelamine pentamethyl ether and 0.9 mol of N-methyldiethanolamine are added simultaneously in the course of 30 minutes; meanwhile the melt is brought to 130° C. and it is kept at this temperature for 3 hours.

The same amount by weight of a paraffin of melting point 52° C. is then introduced into the melt.

PREPARATION OF A COPOLYMER DISPERSION ACCORDING TO THE INVENTION

EXAMPLE 5

The following solutions are prepared at 40° C.:
Solution 1:
  600 parts by weight of demineralized water,
  2.75 parts by weight of benzyldodecyldimethylammonium chloride,
  18.45 parts by weight of the emulsifier solution obtained in Example 2a.
Solution 2:
  247 parts by weight of ethyl acetate,
  30.8 parts by weight of N-methyl-N-perfluorooctanesulphonamidoethyl methacrylate,
  42.6 parts by weight of butyl acrylate,
  30.8 parts by weight of stearyl methacrylate,
  1.125 parts by weight of dilauroyl peroxide (added shortly before emulsification),
Solution 3:
  1.125 parts by weight of t-butylperpivalate,
  1.5 parts by weight of ethyl acetate.

A mixture is prepared from solutions 1 and 2 and this is emulsified at 40° C. in an emulsifying machine until it has constant particle size. The resulting emulsion is poured into a reactor equipped with a stirrer, a reflux condenser and an internal thermometer. Solution 3 is added at 40° C. and the mixture is stirred for 15 minutes.

The temperature is then raised to 70° C. and is kept at this level for 2 hours. The temperature is then increased again and is kept for 2 hours in the range from 70° to 80° C., so that the ethyl acetate can distil off via an additionally mounted distillation bridge.

Finally, stirring is continued for a further hour at 80° C.

Solids content: 14.9%.

Fluorine content of the solid: 14.1%.

Average particle size (according to light scattering): 337 nm.

EXAMPLE 6

The procedure of Example 5 is followed, but in solution 1 the emulsifier solution obtained in accordance with Example 2a is replaced by 14 parts by weight of an emulsifier solution obtained in accordance with Example 3E (see Table 1).

Solids content: 15.4%.

Fluorine content of the solid: 14.6%.

Average particle size (according to light scattering): 476 nm.

PREPARATION OF A COPOLYMER DISPERSION WITH THE OMISSION OF AN EMULSIFIER (I)

EXAMPLE 7

A copolymer dispersion is prepared in accordance with the instructions of Example 5, but with the omission of the solution from Example 2a.

Solids content: 13.7%.

Fluorine content of the solid: 15.4%.

Average particle size (according to light scattering): 327 nm.

PREPARATION OF A COPOLYMER DISPERSION ACCORDING TO THE INVENTION

EXAMPLE 8

The following solutions are prepared at 50° C.:
Solution 1:
  760 parts by weight of demineralized water,
  4.5 parts by weight of an ethoxylated nonylphenol containing 10 EO,
  9.2 parts by weight of the emulsifier solution obtained in accordance with Example 2b. p0 Solution 2:
  300 parts by weight of ethyl acetate,
  55.6 parts by weight of N-methyl-N-perfluorooctanesulphonamidoethyl methacrylate,
  29.5 parts by weight of stearyl methacrylate,
  23.8 parts by weight of vinyl acetate,
  22 8 parts by weight of grafting base as obtained in accordance with Example 4.
The following is prepared at 30° C.
Solution 3:
  1.018 parts by weight of t-butyl perpivalate,
  1.429 parts by weight of dilauroyl peroxide,
  8.1 parts by weight of ethyl acetate.

A mixture of solutions 1 and 2 is prepared and is emulsified at 50° C. in an emulsifying machine. The resulting emulsion is poured into a reactor equipped with a stirrer, a reflux condenser and an internal thermometer, and is allowed to cool to 30° C. Solution 3 is added at 30° C. with stirring. The temperature is raised from 30° to 50° C. in 1 hour and from 50° to 70° C. in the course of a further hour. The reaction mixture is then kept at 70° C. for 2 hours with stirring.

The mixture is then kept at 70°-80° C. for 3 hours, so that the ethyl acetate can distil off via an additionally mounted distillation bridge.

Solids content: 13.6%.
Fluorine content of solid: 23.5%.
Average particle size (according to light scattering): 328 nm.

PREPARATION OF A COPOLYMER DISPERSION WITH THE OMISSION OF AN EMULSIFIER (I)

EXAMPLE (9)

The following solutions are prepared at 50° C.:
Solution 1:
  760 parts by weight of demineralized water,
  4.54 parts by weight of an ethoxylated nonylphenol, 10 EO,
  1.8 parts by weight of benzyldodecyldimethylammonium chloride,
Solution 2:
  300 parts by weight of ethyl acetate,
  55.6 parts by weight of N-methyl-N-perfluorooctanesulphonamidoethyl methacrylate,
  29.5 parts by weight of stearyl methacrylate,
  23.8 parts by weight of vinyl acetate,
  22.8 parts by weight of grafting base as obtained in Example 4.
The following solution is prepared at 30° C.:
Solution 3:
  1.018 parts by weight of t-butyl perpivalate,
  1.429 parts by weight of dilauroyl peroxide,
  8.1 parts by weight of ethyl acetate.

A mixture of solutions 1 and 2 is prepared and this mixture is emulsified at 50° C. in an emulsifying machine. The resulting emulsion is poured into a reactor equipped with a stirrer, a reflux condenser and an internal thermometer and is allowed to cool to 30° C. Solution 3 is added at up to 30° C., with stirring, and the temperature is raised in the course of one hour from 30° to 50° C. and also from 50° to 70° C. in the course of a further hour. The reaction mixture is then left at 70° C. for 2 hours. The temperature is then kept at 70°-80° C. for 3 hours and, in the course of this, the ethyl acetate is distilled off via an additionally mounted distillation bridge.

Solids content: 13.1%.
Fluorine content in the solid: 26.7%.
Average particle size (according to light scattering): 270 nm.

Tables 1 and 2 show the results of technical performance in use which are obtained when the copolymer dispersions prepared in accordance with Example 5 to 9 are employed in imparting an oil-repellent/water-repellent finish to carpets based on synthetic polyamide fibres.

TABLE 1

|  | Oleo-repellent character[1] | Water-repellent character[2] |
|---|---|---|
| Example 5 | 4–5 | 50/50 |
| Example 6 | 6 | 30/70 |
| Example 7 | 3 | 60/40/–70/30 |

Compared with the copolymer dispersions prepared without the use of an emulsifier (I), there is a marked improvement of both the oleo-repellent and the water-repellent action when such an emulsifier is used. The soiling behaviour of the carpets finished with the copolymer dispersions according to the invention is improved and conforms with increased requirements.

TABLE 2

|  | Oleo-repellent character[1] | Water-repellent character[2] |
|---|---|---|
| Example 8 | 4–5 | 60/40–70/30 |
| Example 9 | 3 | 80/20 |

[1]According to AATCC test method 118
[2]Resistance to aqueous isopropanol solutions by the standard method.

The polymerization according to the invention is also superior in the case of this comparison.

PREPARATION OF A COPOLYMER DISPERSION ACCORDING TO THE INVENTION

EXAMPLE 10

1st stage: Preparation of the precursor latex
The following solutions are prepared at 50° C.:
Solution 1:
  800 parts by weight of demineralized water,
  5 parts by weight of ethoxylated nonylphenol containing on average 10 ethylene oxide units,
  6.9 parts by weight of benzyldodecyldimethylammonium chloride,
  17.3 parts by weight of the emulsifier solution obtained in accordance with Example 2c.
Solution 2:
  402 parts by weight of ethyl acetate,
  43.5 parts by weight of dioctyl adipate,
  54.2 parts by weight of N-methyl-N-perfluorooctanesulphonamidoethyl methacrylate,
  24.9 parts by weight of stearyl methacrylate,
  1.44 parts by weight of isobutyl methacrylate.

The following solution is prepared at room temperature:

Solution 3:
  0.9 part by weight of t-butyl perpivalate,
  2.1 parts by weight of ethyl acetate,
  0.9 part by weight of didecanoyl peroxide.

A mixture of solutions 1 and 2 is prepared and this mixture is emulsified five times at 50° C. in an emulsifying machine. The resulting emulsion is poured into a reactor equipped with a stirrer, a reflux condenser and an internal thermometer. Solution 3 is added at 50°C., with stirring. Stirring is continued for a further half hour at 50°C. and the temperature is then raised from 50° to 70° C. in the course of 1 hour and is afterwards kept at 70° C. for 2 hours. The reaction mixture is then allowed to react for 3 hours under reflux (at approximately 70° C.). A precursor latex of 10.4% solids content is obtained.

2nd stage: Preparation of the copolymer dispersion according to the invention using the precursor latex from stage 1

The following solutions are prepared at 50° C.:

Solution 1:
  1365 parts by weight of precursor latex from stage 1,
  34.3 parts by weight of ethyl acetate,
  45.3 parts by weight of isobutyl methacrylate,
  2.8 parts by weight of N-methyl-N-perfluorooctanesulphonamidoethyl methacrylate.

Solution 2:
  0.943 part by weight of t-butyl perpivalate,
  1.75 parts by weight of ethyl acetate,
  0.48 part by weight of didecanoyl peroxide.

Solution 1 is emulsified at 50° C. in an emulsifying machine and is then poured into a reactor equipped with a stirrer, a reflux condenser and an internal thermometer. Solution 2 is added at 50° C., with stirring, and the whole is stirred for a further half hour at 50° C. The mixture is then heated from 50° to 70° C. in the course of 1 hour and is kept at 70° C. for a further 2 hours. It is then kept at 70°-80° C. for a further 2 hours, in the course of which the ethyl acetate distils off via an additionally mounted distillation device. Finally, stirring is continued for a further hour at 80° C.

Solids content: 21.2%.
Fluorine content of the solid: 13.6%.

EXAMPLE 11

The procedure followed is as in Example 10, but the emulsifier solution obtained in accordance with Example 2c is replaced by 17.3 parts by weight of an emulsifier solution obtained in accordance with Example 3E (see table) in order to prepare the precursor latex (1st stage) in solution 1.

Solids content: 23.2%.
Fluorine content of the solid: 14.4%.

Unless an emulsifier (I) is added before the emulsion polymerization, unstable polymer dispersions are obtained. In a test of technical performance in use as in Examples 5 to 9, an oleo-repellent rating of 3–4 was obtained for Example 10 and a rating of 6 was obtained for Example 11, and values of 60/40 to 70/30 and a value of 70/30 for the water-repellent rating were obtained for Example 10 and Example 11, respectively.

We claim:

1. Aqueous dispersions of copolymers and graft copolymers formed from ethylenically unsaturated perfluoroalkyl monomers and ethylenically unsaturated monomers free from perfluoroalkyl groups, characterized in that they are obtained by (graft) copolymerization in the presence of polymeric emulsifiers of the general formula $$\left[\left[-CH_2-\underset{\underset{\underset{R^3-N-R^2}{\underset{|}{(CH_2)_a}}}{\underset{|}{\underset{|}{X}}}}{\overset{R^1}{\underset{|}{C}}}-\right]_b \left[-CH_2-\underset{\underset{R^5}{\underset{|}{O}}}{\underset{|}{\underset{|}{C=O}}}\overset{R^1}{\underset{|}{C}}-\right]_c \left[-CH_2-\underset{\underset{R^6}{\underset{|}{O}}}{\underset{|}{\underset{|}{C=O}}}\overset{R^1}{\underset{|}{C}}-\right]_d \rightarrow \right.$$

$$\left. \left[-CH_2-\underset{\underset{R^5}{\underset{|}{\bigcirc}}}{\overset{R^1}{\underset{|}{C}}}-\right]_e \left[-CH_2-\underset{\underset{|}{C\equiv N}}{\overset{R^1}{\underset{|}{C}}}-\right]_f\right]_g$$

wherein
  X denotes oxygen or NH,
  $R^1$ denotes hydrogen or methyl,
  $R^2$ denotes $C_1-C_4$-alkyl,
  $R^3$ denotes $C_1-C_4$-alkyl,
  $R^4$ denotes H, $C_1-C_{18}$-alkyl, aralkyl or cycloalkyl or a radical of the formula $$-CH_2-\underset{\underset{OH}{|}}{CH}-CH_2-Q \ (Q = H, Cl, Br \ or \ C_1-C_{15}\text{-alkyl}),$$

$R^5$ denotes hydrogen or $C_1-C_8$-alkyl,
  $R^6$ denotes $C_{12}-C_{24}$-alkyl,
  $W^{31}$ denotes an anion,
  a denotes 1–3 and the weight fractions b, c, d, e and f denote 0.1–0.8, 0–0.5, 0–0.5, 0–0.7 and 0–0.6, respectively, b+c+d+e+f being 1, and
  g should be so chosen that molecular weights $M_w$ of 5,000 to 1,000,000 result.

2. Aqueous dispersions according to claim 1, characterized in that they are obtained in the presence of emulsifiers of the formula (I) wherein
  $R^2$ and $R^3$ independently of one another represent methyl or ethyl,
  $R^4$ represents $C_1-C_6$-alkyl, benzyl, phenylethyl or cyclohexyl or a radical of the formula $$-CH_2-\underset{\underset{OH}{|}}{CH}-CH_2-Q$$

$R^5$ represents hydrogen or $C_1-C_8$-alkyl,
  $R^6$ represents $C_{15}-C_{22}$-alkyl and
  $W^-$ represents $Cl^-$, $Br^-$, $\frac{1}{2} SO_4^{2-}$, $\frac{1}{3} PO_4^{3-}$, $CH_3-O-SO_3^{31}$ or $CH_3-COO^-$, the remaining symbols have the meaning indicated in claim 1.

3. Aqueous dispersions according to claim 1, characterized in that 0.1–7% by weight of the emulsifiers (I) are employed, relative to the total monomer mixture.

4. Aqueous dispersions according to claim 1, characterized in that the perfluoroalkyl monomers copolymerized are compounds of the formulae

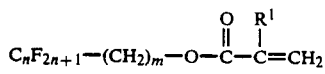

and

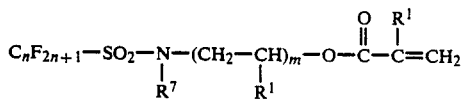

wherein
$R^1$ denotes hydrogen or methyl,
$R^7$ denotes $C_1$–$C_4$-alkyl,
m denotes 1 or 2 and
n denotes 6–12.

5. Aqueous dispersions according to claim 1, characterized in that the perfluoroalkyl monomers are copolymerized with mixtures of monomers containing at least one component of the formula

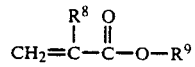   IV wherein
$R^8$ represents hydrogen, methyl or fluorine and
$R^9$ represents a $C_8$–$C_{22}$-alkyl radical.

6. Aqueous dispersions according to claim 1, characterized in that the (graft) copolymerization is carried out at 50°–100° C.

7. Aqueous dispersions according to claim 1, characterized in that the (graft) copolymerization is carried out in the presence of nonionic and/or cationic emulsifiers.

* * * * *

UNITED STATES PATENT AND TRADEMARK OFFICE
CERTIFICATE OF CORRECTION

PATENT NO. : 4,997,873
DATED : March 5, 1991
INVENTOR(S) : Suling et al.

It is certified that error appears in the above-identified patent and that said Letters Patent is hereby corrected as shown below:

Title Page      ABSTRACT: Line 4 delete 1st " from " and substitute -- free --

Col. 12, line 42    Delete " $W^{31}$ " and substitute -- $W^-$ --

Col. 12, line 64    Delete " $SO_3^{31}$ " and substitute -- $SO_3^-$ -- and before " the " insert -- and --

Signed and Sealed this

Twelfth Day of January, 1993

*Attest:*

DOUGLAS B. COMER

*Attesting Officer*      *Acting Commissioner of Patents and Trademarks*